United States Patent
Choi

(10) Patent No.: US 8,897,777 B2
(45) Date of Patent: Nov. 25, 2014

(54) METHOD AND MOBILE DEVICE FOR PERFORMING FAST HAND-OVER IN WLAN AND METHOD OF SWITCHING SERVICES USING GPS INFORMATION

(75) Inventor: Hyong-uk Choi, Seoul (KR)

(73) Assignee: Samsung Electroncis Co., Ltd., Suwon (KR)

( * ) Notice: Subject to any disclaimer, the term of this patent is extended or adjusted under 35 U.S.C. 154(b) by 586 days.

(21) Appl. No.: 11/328,215

(22) Filed: Jan. 10, 2006

(65) Prior Publication Data

US 2007/0025293 A1 Feb. 1, 2007

(30) Foreign Application Priority Data

Jul. 27, 2005 (KR) .................. 10-2005-0068620

(51) Int. Cl.
- *H04W 36/00* (2009.01)
- *H04W 36/32* (2009.01)
- *H04W 84/12* (2009.01)

(52) U.S. Cl.
CPC .......... *H04W 36/0083* (2013.01); *H04W 36/32* (2013.01); *H04W 84/12* (2013.01)
USPC ........................................................ 455/436

(58) Field of Classification Search
CPC ..... H04W 36/00; H04W 36/08; H04W 36/10; H04W 36/18; H04W 36/32; H04W 4/02; H04W 48/04; H04W 64/00
USPC ........... 455/436, 456.1, 446, 437, 440, 452.2, 455/457; 370/331
See application file for complete search history.

(56) References Cited

U.S. PATENT DOCUMENTS

| | | | |
|---|---|---|---|
| 6,360,264 B1 * | 3/2002 | Rom | 709/227 |
| 6,711,408 B1 * | 3/2004 | Raith | 455/440 |
| 2003/0087646 A1 | 5/2003 | Funato et al. | |
| 2003/0134637 A1 * | 7/2003 | Cooper | 455/432 |
| 2004/0121781 A1 | 6/2004 | Sammarco | |
| 2004/0137905 A1 | 7/2004 | Jeong et al. | |
| 2004/0192328 A1 | 9/2004 | Giacalone et al. | |
| 2004/0203792 A1 | 10/2004 | Shaheen et al. | |
| 2004/0224716 A1 | 11/2004 | Choi | |
| 2005/0143089 A1 * | 6/2005 | Dowling et al. | 455/456.1 |
| 2007/0184831 A1 * | 8/2007 | Morimoto | 455/432.1 |

FOREIGN PATENT DOCUMENTS

| | | |
|---|---|---|
| EP | 1 379 013 | 1/2004 |
| KR | 2002-96236 | 12/2002 |
| KR | 2004-96741 | 11/2004 |
| KR | 2005-8001 | 1/2005 |
| WO | WO 02/076117 | 9/2002 |

* cited by examiner

*Primary Examiner* — Wayne Cai
*Assistant Examiner* — Shantell L Heiber
(74) *Attorney, Agent, or Firm* — Staas & Halsey LLP

(57) ABSTRACT

A fast hand-over method of a mobile device roaming in a wireless LAN environment includes: receiving GPS information; based on the received location information of the mobile device, searching one or more APs; by scanning the searched APs, detecting an AP to reassociate with; and reassociating with the detected AP. According to the method, when roaming in a wireless LAN environment, a mobile device calculates a moving path by using GPS information and then, by scanning only APs belonging to channels allocated to areas related to the moving direction, the mobile device can reduce a hand-over period, and as a result, a QoS guaranteed service can be provided continuously. Also, by using GPS information, the mobile device can selectively switch to an optimum network service in an area to which different network services are applied.

47 Claims, 7 Drawing Sheets

FIG. 4

| BSSID | AP ADDRESS | CHANNEL | LOCATION |
|---|---|---|---|
| Hotspot-0 | 00-00-00-00-00-11 | 1 | 00°00'-ZZ"ZZ' |
| Hotspot-1 | 00-00-00-00-00-31 | 4 | 00°00'-XX"XX' |
| Hotspot-2 | 00-00-00-00-00-51 | 7 | 00°00'-YY"YY' |
| Hotspot-3 | 00-00-00-00-00-71 | 10 | 00°00'-GG"GG' |
| ... | ... | ... | ... |

METHOD AND MOBILE DEVICE FOR PERFORMING FAST HAND-OVER IN WLAN AND METHOD OF SWITCHING SERVICES USING GPS INFORMATION

CROSS-REFERENCE TO RELATED PATENT APPLICATION

This application claims the benefit of Korean Patent Application No. 2005-68620, filed on Jul. 27, 2005 in the Korean Intellectual Property Office, the disclosure of which is incorporated herein in its entirety by reference.

BACKGROUND OF THE INVENTION

1. Field of the Invention

The present invention relates to a method of providing fast hand-over or switching services in a wireless local area network (LAN) service, and more particularly, to a method of reducing a hand-over period in the wireless LAN by using global positioning system (GPS) information, a mobile device performing the method, and a method of switching to an optimum service mode by using the GPS information.

2. Description of the Related Art

As use of multimedia data has been increasing and networks have become wireless, users now want to receive a quality of service (QoS), which is provided in the conventional wired network, also in a wireless environment (such as a wireless LAN). Generally, QoS implements an idea that transmission rates, error rates, and other characteristics can be measured, improved, and, to some extent, guaranteed in advance through management of different data transmission, and is of particular concern for the continuous transmission of high-bandwidth information on a network. However, despite the technology development in layer 3 (L3) supporting the QoS, the development has not improved much in mobile environments that are most important in the wireless LAN. This is because a resource-contention type design is employed, basically, in an IEEE 802.11 based wireless LAN when a medium access control (MAC) protocol is designed, and a mechanism to guarantee the QoS is not included. Accordingly, it is difficult to support a fast handoff service when a mobile device travels between cells.

FIG. 1 illustrates an ordinary wireless LAN service environment, and, with reference to FIG. 1, the operation of a mobile device when it is roaming will now be explained. Referring to FIG. 1, three cells are divided as subnets X 100, Y 110, and Z 120. The subnets X 100, Y 110, and Z 120 include access points (APs) 101, 111, and 121, respectively, operating in an IEEE 802.11 wireless LAN environment. Assuming that a mobile station (MS) 102 of the subnet X 100 QoS-connected from an MS 122 in the subnet Z 120 is roaming to the subnet Y 110 and the subnet X 100 and the subnet Y 110 belong to an identical extended service set (ESS), the operation will now be explained.

As the MS 102 approaches to the subnet Y 110 by being carried by a user, the signal from the AP 101 of the subnet X 100 becomes weak. Then, the MS 102 starts channel scanning for roaming. In the case of a passive scanning mode, the MS 102 receives a beacon frame from the subnet Y 110, in the case of an active scanning mode, the MS 102 transmits a probe request to APs on each channel and an AP transmitting a stronger beacon frame or probe response is selected. In this example, the AP 111 of the subnet Y 110 is selected. The MS 102 transmits a reassociation request to the currently selected AP 111. The reassociation request is a service item defined in the IEEE 802.11 standard and is used to change a basic service set (BSS) or a current connection state in an ESS. In the reassociation request, information on the previously connected AP 101 and the MS 102 itself is included. The new AP 111 notifies the handoff of the MS 102 to the previous AP 101.

In the roaming service of the wireless LAN environment of FIG. 1, as the case of roaming from the subnet X to the subnet Y, the connection between APs providing services to the MS 102 is terminated when the hand-over is performed such that the QoS is not guaranteed. A particular problem in this process is a scanning delay time taken to search for a new AP when an MS is roaming. The scanning delay time is 300~400 msec per channel. Thus, when the number of entire channels is 12 to 14, the scanning delay time is at least 5 seconds or more. So far, the AP 101 of the subnet X 100 cannot recognize the roaming of the MS 102. Accordingly, the AP 101 transmits QoS data continuously to the MS 102 that has been already connected to another AP 111. However, since the AP 101 cannot receive an acknowledgement (ACK) for providing data, from the MS 102, this affects the performance of the entire subnet X 100 greatly. Likewise, the MS 102 loses data provided by the subnet X 100.

SUMMARY OF THE INVENTION

An aspect of the present invention provides an apparatus for and method of providing fast hand-over by a mobile device operating in a wireless LAN environment and performing AP search by using GPS information when the mobile device is roaming.

According to an aspect of the present invention, there is provided a hand-over method of a mobile device roaming in a wireless local area network (LAN) environment including: receiving global positioning system (GPS) location information; based on the received location information of the mobile device, searching at least one access point (AP); by scanning the searched AP, detecting an AP to reassociate with; and reassociating with the detected AP.

According to an aspect of the present invention, the searching of at least one AP includes: calculating a moving direction or moving path of the mobile device by using a plurality of GPS information items; and obtaining information on at least one AP included in a predetermined range on the basis of the moving direction or moving path, from a channel table including location information of APs on all of the channels.

According to an aspect of the present invention, the detecting of the AP includes: generating a list including the obtained AP information; updating an existing scanning channel list with the generated list; and detecting an AP to be reassociated with, by scanning the APs of the updated channel list.

According to an aspect of the present invention, the predetermined range is divided into a first level including APs on all channels, a second level including APs on channels within a first angle, a third level including APs on channels within a second angle less than the first angle, and a fourth level including an AP within a narrowest angle in the moving direction or moving path of the mobile device.

According to an aspect of the present invention, the searching of at least one AP includes searching the AP belonging to the range of the fourth level.

According to an aspect of the present invention, the searching of at least one AP includes searching the APs belonging to the range of the third level.

According to an aspect of the present invention, the searching of at least one AP includes searching the APs belonging to the range of the second level.

According to an aspect of the present invention, the searching of at least one AP and detecting the AP includes: searching the AP of the fourth level on the basis of the moving direction or moving path of the mobile device; if as the result of the scanning the AP of the fourth level, a matching AP is not detected, searching the APs belonging to the third level; if as the result of the scanning the APs of the third level, a matching AP is not detected, searching the APs belonging to the second level; and if as the result of the scanning the APs of the second level, a matching AP is not detected, searching the APs belonging to the first level.

According to an aspect of the present invention, each of the AP related information items stored in the channel table includes a basic service set (BSS) ID, an AP address, channel information, and GPS information of the AP.

According to another aspect of the present invention, there is provided a mobile device performing hand-over when roaming in a wireless LAN environment including: a unit receiving GPS information; a unit searching at least one AP, based on the received location information of the mobile device, by scanning the searched AP; a unit detecting an AP to reassociate with, by scanning the searched AP; and a unit reassociating with the detected AP.

According to an aspect of the present invention, the AP search unit includes: a unit calculating a moving direction or moving path of the mobile device by using a plurality of GPS information items; a channel table including location information of APs on all of the channels; and a unit obtaining information on at least one AP included in a predetermined range on the basis of the moving direction or moving path, from the channel table.

According to an aspect of the present invention, the unit detecting an AP to reassociate with, by scanning the searched AP, generates a list including the obtained AP information, updates an existing scanning channel list with the generated list, and detects an AP to be reassociated with, by scanning the APs of the updated channel list.

According to an aspect of the present invention, the predetermined range is divided into a first level including APs on all channels, a second level including APs on channels within a first angle, a third level including APs on channels within a second angle less than the first angle, and a fourth level including an AP within a narrowest angle in the moving direction or moving path of the mobile device.

According to an aspect of the present invention, the AP search unit searches the AP belonging to the range of the fourth level.

According to an aspect of the present invention, the AP search unit searches the APs belonging to the range of the third level.

According to an aspect of the present invention, the AP search unit searches the APs belonging to the range of the second level.

According to an aspect of the present invention, the AP search unit and the AP detection unit search the AP of the fourth level on the basis of the moving direction or moving path of the mobile device; if as the result of the scanning the AP of the fourth level, a matching AP is not detected, search the APs belonging to the third level; if as the result of the scanning the APs of the third level, a matching AP is not detected, search the APs belonging to the second level; and if as the result of the scanning the APs of the second level, a matching AP is not detected, search the APs belonging to the first level.

According to an aspect of the present invention, the channel table includes a basic service set (BSS) ID, an AP address, channel information, GPS information of the AP, or combinations thereof.

According to still another aspect of the present invention, there is provided a method of switching services of a mobile device including: obtaining current location information of the mobile device through a GPS receiver; based on the obtained current location information of the mobile device, recognizing a network service receivable by the mobile device at the current location; if the number of the recognized network services is two or more, determining one network service according to a predetermined condition; and switching to the determined network service.

According to an aspect of the present invention, in the recognizing of the network services, the network service corresponding to the current location of the mobile device is recognized from a database storing types of a variety of networks and applied areas in advance.

According to an aspect of the present invention, the predetermined condition is a most efficient price in comparison with data service prices by service.

According to an aspect of the present invention, the predetermined condition is selection of a user of the mobile device.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects, features and advantages of the present invention will become more apparent and more readily appreciated by describing in detail exemplary embodiments thereof with reference to the accompanying drawings in which:

FIG. 4 illustrates an example of a channel table included in a mobile device of FIG. 2;

DETAILED DESCRIPTION OF THE EMBODIMENTS

Figure 1:
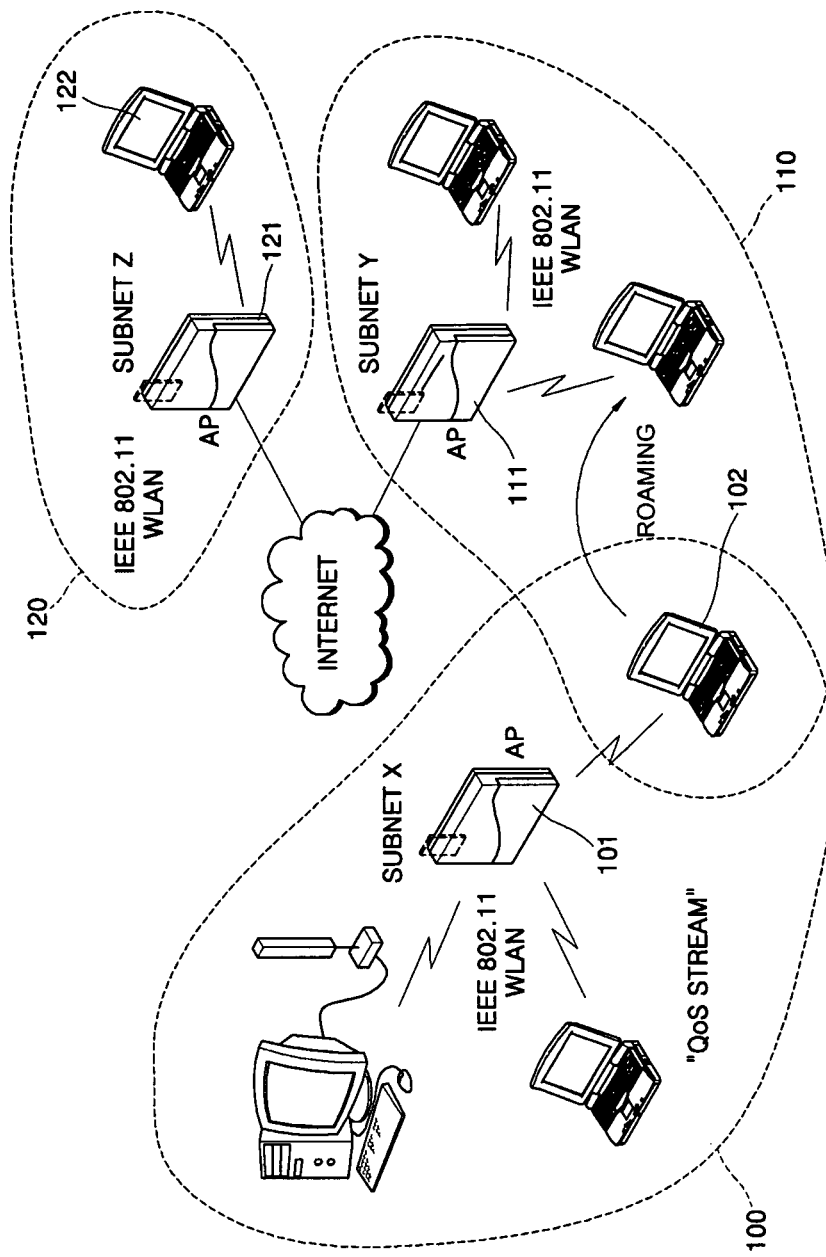
FIG. 1 illustrates an ordinary wireless LAN service environment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
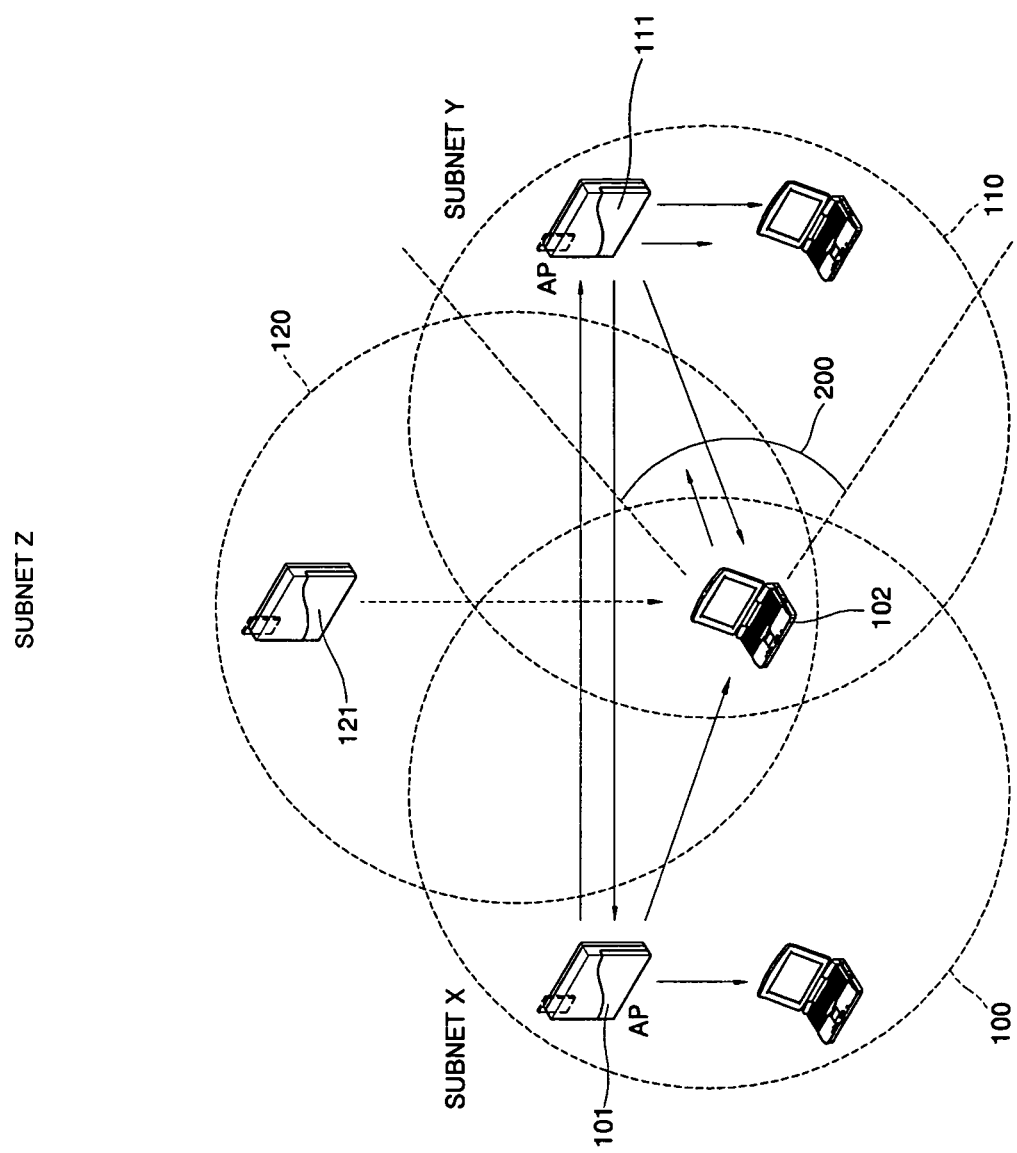
FIG. 2 is a schematic diagram of a wireless LAN service environment to which an embodiment of the present invention is applied.

FIG. 2 is a schematic diagram of a wireless LAN service environment to which an embodiment of the present invention is applied, and the structure of the environment is not otherwise different from that of the environment of FIG. 1. However, in the embodiment of the present invention in FIG.

2, a roaming mobile device 102 is estimating its moving direction or moving path by using GPS information. By doing so, only APs in a predetermined range 200 based on the moving direction or moving path are scanned and a new AP 111 can be found quickly. This anticipation of a new AP is a difference between an aspect of the present invention and an aspect of the ordinary hand-over method described above with reference to FIG. 1.

Figure 3:
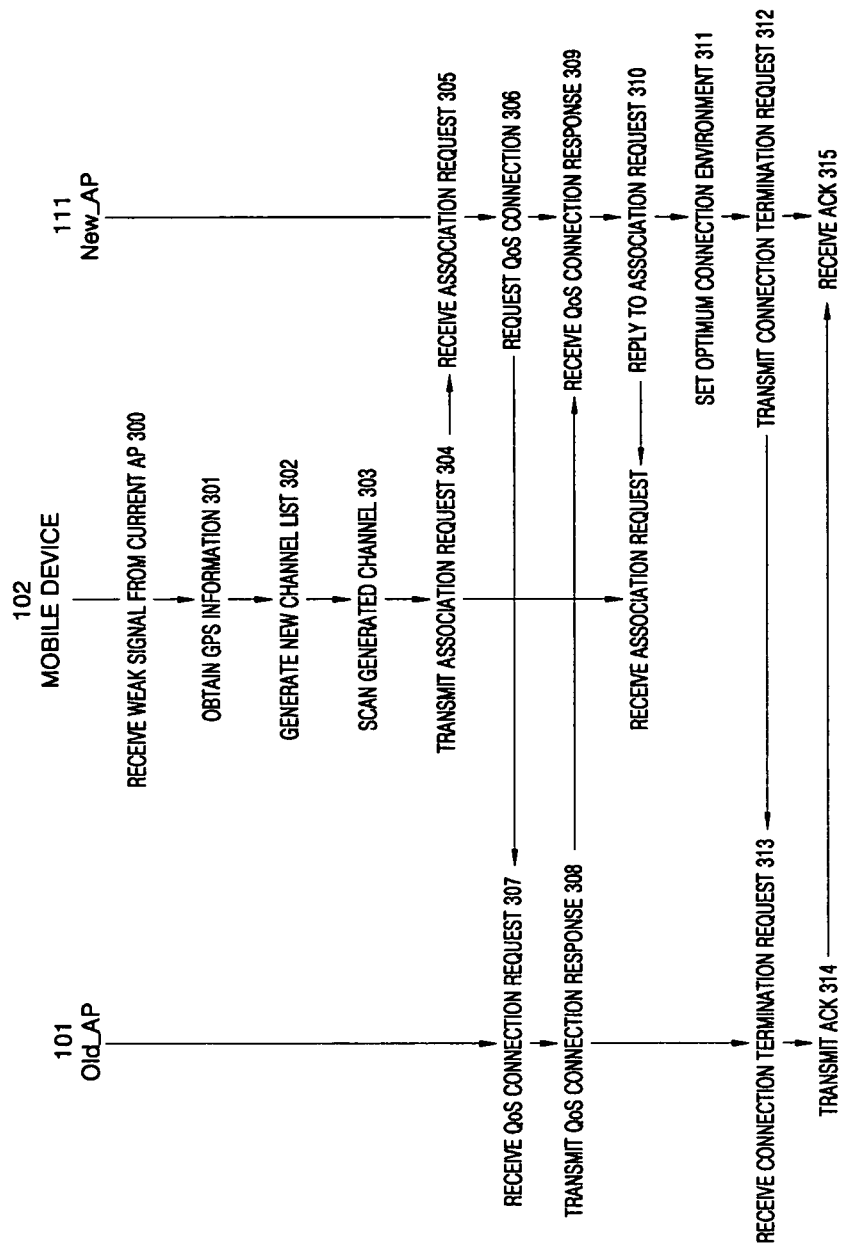
FIG. 3 illustrates a fast hand-over procedure according to an embodiment of the present invention performed among a mobile device, and APs of FIG. 2.

FIG. 3 illustrates a fast hand-over procedure according to an embodiment of the present invention performed among a mobile device 102, and APs (old_AP 101 and new_AP 111) of FIG. 2. The mobile device 102, while in the subnet X 100 maintaining a QoS connection with the subnet Z 120, receives at a location in the subnet X 100, a strong signal (for example, a cyclic beacon signal) from the current AP 101. However, as the mobile device 102 moves toward another subnet (for example, subnet Y 110), the strength of the signal received from the current AP 101 becomes weaker.

If it is detected that the strength of the signal received from the current AP 101 is less than a predetermined threshold in operation 300, the mobile device 101 recognizes that a handoff of the mobile device 101 shifting away from the current AP 101 occurs, and begins the following procedure of a hand-over.

The mobile device 102 is in communication with a GPS receiver, which is included in the mobile device 102 or is separately connected to the mobile device 102 (such as through wired or wireless connection) and can be accessed by the mobile device 102. The mobile device 102 obtains its location information in operation 301 using the GPS receiver. That is, the obtaining of the location information by the mobile device 102 through the GPS receiver is performed many times in a predetermined period, and the mobile device 102 estimates its moving direction or moving path by using the GPS information obtained many times. While described in terms of a GPS receiver or GPS information, it is noted that the position of the mobile device 102 can be determined other than using GPS information and/or a GPS received.

Further, the mobile device 102 stores a database or a channel table storing information on APs for all of the entire channels in the current wireless LAN environment together with their location information. Among the location information of the APs in this channel table, the mobile device 102 selects at least one AP that is determined to be in the field of vision (200 of FIG. 2) within a predetermined angle on the basis of the current moving path of the mobile device 102 as an axis, and generates a channel list including only these selected APs in operation 302. The mobile device 102 performs scanning of only the APs included in the generated channel list in operation 303. While not required, the database or channel table can be stored in a memory or periodically obtained from the APs. Moreover, the memory can be a volatile or non-volatile memory according to aspects of the invention.

If the scanning result indicates that there is only one AP on the channel list and it is determined that the AP is a matching AP, or if it indicates that there are a plurality of APs on the channel list and one of the APs is determined to be a matching AP, the mobile device 102 transmits a reassociation request to the AP (in this example, the AP 111 of the subnet Y 110) in operation 304. The AP 111 receives the reassociation request from the mobile device 102 in operation 305 and then transmits a QoS connection request to the previous AP 101 of the subnet X 100 to which the mobile device 102 belonged previously, in operation 306.

The AP 101 receives the QoS connection request from the AP 111 of the subnet Y 110 in operation 307, and transmits a QoS connection response to the request in operation 308. Then, the AP 111 receives the QoS connection request response from the AP 101 in operation 309 and then transmits a reassociation response to the mobile device 102 in operation 310. The AP 111 sets an optimum connection environment to provide a service (preferably a QoS connection) to the mobile device 102 in operation 311. The AP 111 further transmits a request to terminate the connection with the mobile device 102, to the AP 101 in operation 312. The AP 101 receives the request to terminate connection to the mobile device 102 in operation 313, and if the AP 101 transmits an acknowledgement signal (ACK) for that to the AP 111 in operation 314, the AP 111 provides the service to the mobile device 102 upon receiving the ACK signal. It is understood that ones of these operations can be combined, taken in different order, and/or omitted (such as operation 311) according to aspects of the invention.

A method of generating a channel list by using GPS information will now be explained in more detail. FIG. 4 illustrates an example of a channel table included in a mobile device. The channel table includes whole channel information classified in a hot spot and the like to which the corresponding wireless LAN service is applied, and includes a basic service set (BSS) ID for each channel, an AP address belonging to the channel, a channel number, and GPS information of an AP. The table can have additional and/or less information while still conveying sufficient location information to be used in the present invention. Further, the table can be updated and/or refreshed prior to or during the hand off operations of the present invention. The mobile device 102, which calculated its moving direction or moving path from the GPS information, can select channel(s) at locations within a predetermined angle from the moving direction or moving path, in the channel table of FIG. 4.

Figure 5:
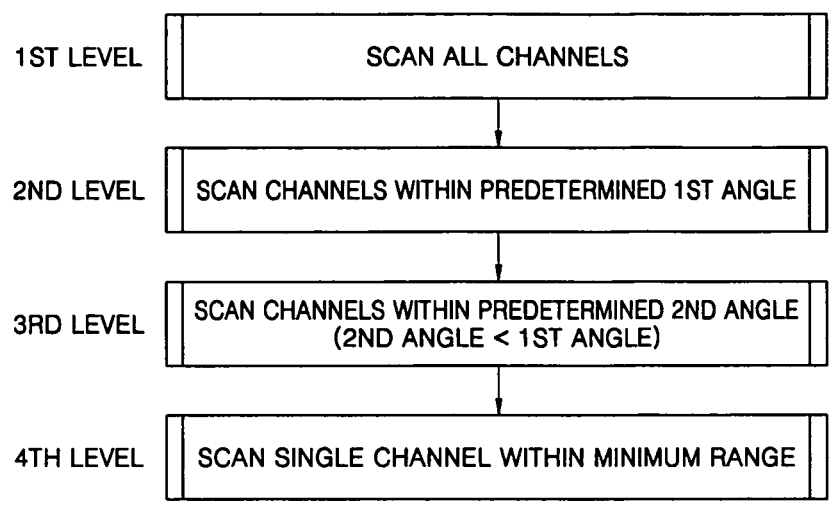
FIG. 5 illustrates hierarchical requirements applied to AP scanning in a hand-over procedure according to an embodiment of the present invention.

In relation to the calculated moving direction or moving path with the predetermined angle, an AP scanning range can be determined by applying hierarchical conditions as shown in FIG. 5. In FIG. 5, a first level includes all channels stored in the channel table of FIG. 4. A second level includes APs belonging to neighboring channels included in a predetermined angle (for example, 60 degrees) of a field of vision on the basis of the moving direction or moving path of the mobile device 102. A third level includes APs belonging to neighboring channels included in a predetermined angle less than that of the second level (such as 30 degrees), of a field of vision. A fourth level includes one channel in the moving direction of the mobile device 102 or one channel belonging to a narrowest range on the basis of the moving path. Accordingly, the number of the level increases, the number of APs to be fetched from the channel table and scanned decreases, and the time taken for scanning is reduced.

First, the mobile device 102 finds one AP corresponding to the fourth level in the channel table and performs scanning. If a matching AP (for example, an AP transmitting a signal with a strength greater than a predetermined value) is not detected as the result of the scanning, the mobile device 102 finds APs corresponding to the third level in the channel table and performs scanning. If a matching AP is again not detected as the result of the scanning, the mobile device 102 finds APs corresponding to the second level in the channel table and performs scanning. If a matching AP is not detected, the mobile device 102 can finally perform scanning of APs on all channels belonging to the first level. Unlike this, each level may be set independently and the mobile device 102 can find AP(s) satisfying a specified level condition from the channel table and perform scanning.

Generally, when a roaming mobile device 102 is at a location where BSSs are overlapping, the mobile device sequentially transmits a probe request to all channels in the wireless LAN service environment, and receives a probe response from an AP of the channel. Then, the mobile device 102 waits for a maximum duration before transmitting a probe request signal to a next channel. However, in an aspect of the present invention, in the levels except the first level, to be performed with priority, predetermined APs to be scanned are already known to the mobile device. Accordingly, when a probe response signal from each AP is received and the AP is not a matching AP, the mobile device 102 can scan other channels in the corresponding level without waiting. As a result, the scanning time is reduced greatly and therefore the QoS can be guaranteed.

Figure 6:
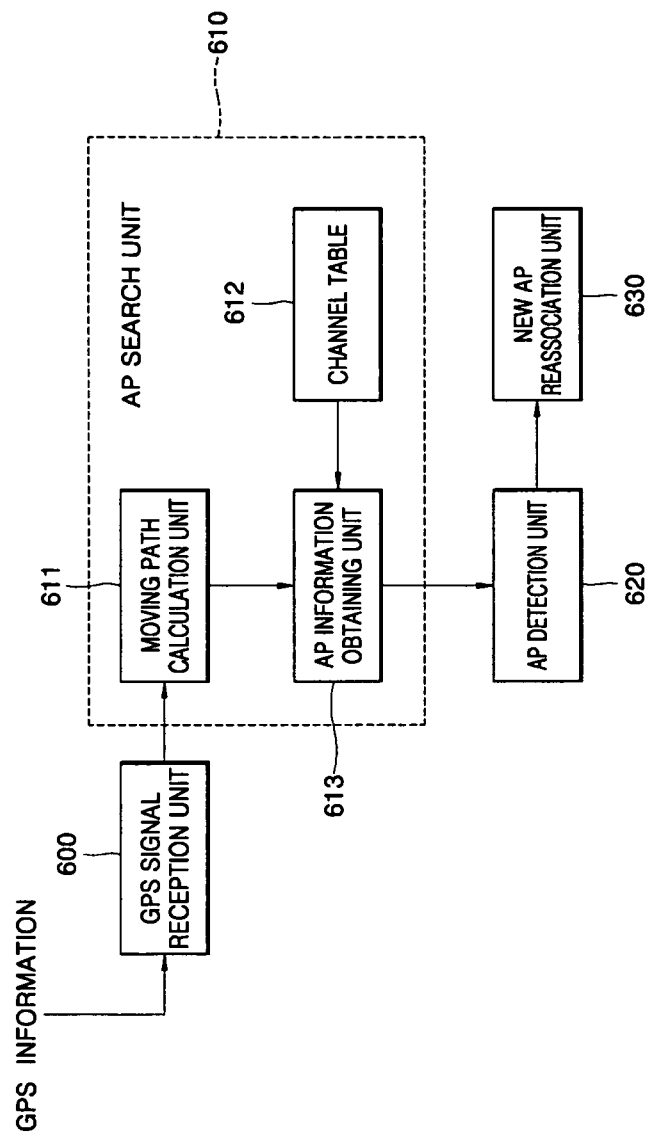
FIG. 6 is a schematic diagram of the structure of a mobile device performing hand-over in a wireless LAN environment according to an embodiment of the present invention.

FIG. 6 is a schematic diagram of the structure of a mobile device 102 performing hand-over in a wireless LAN environment according to an embodiment of the present invention. The mobile device 102 performing hand-over when roaming in a wireless LAN environment includes a unit 600 for receiving GPS information, a unit 610 for search at least one AP based on the received location information of the mobile device, a unit for detecting an AP to be reassociated with by scanning the detected APs, and a unit 630 for reassociating with the detected AP. While not required, it is understood that examples of the mobile device 102 include portable computers, personal digital assistants (PDAs), cellular phones having wireless capability, navigation devices, and/or other devices which assess networks at least wirelessly.

The AP search unit 610 includes a unit 611 for calculating a moving direction or moving path of the mobile device by using a plurality of GPS information items, a channel table 612 storing location information of APs on all channels, and a unit 613 for obtaining information on at least one AP included in a predetermined range on the basis of the moving direction or moving path. Here, the predetermined range indicates the ranges with respect to the hierarchical levels described above with reference to FIG. 5. That is, the ranges to be applied correspond to the first level including APs on all channels, the second level including APs on channels in the first angle, the third level including APs on channels in the second angle narrower than the first angle, and the fourth level including one AP in the narrowest angle in relation to the moving direction or moving path of the mobile device.

The AP search unit 610 searches for the AP belonging to the range of the fourth level according to an aspect of the invention. However, it is understood that the starting level can be otherwise set.

A unit 620 for detecting an AP to be reassociated with by scanning the searched APs, generates a list including information on an AP belonging to the fourth level, updates the existing scanning channel list with the generated list, and detects an AP to be reassociated with, by scanning APs in the updated channel list. If a matching AP is not detected by the scanning, the AP search unit 610 searches APs in the third level and according to the result the search unit 620 performs the above process again. By doing so, the APs are scanned and a matching AP is detected. Thus, the AP search unit 610 and the AP detection unit 620 perform AP search and scanning from the narrowest range (the highest level), and if a matching AP is not detected, AP search and scanning are performed, by expanding the range. Once an AP is detected, the new AP reassociation unit 630 reassociates the mobile device 102 with the selected AP detected by the AP detection unit 620.

Figure 7:
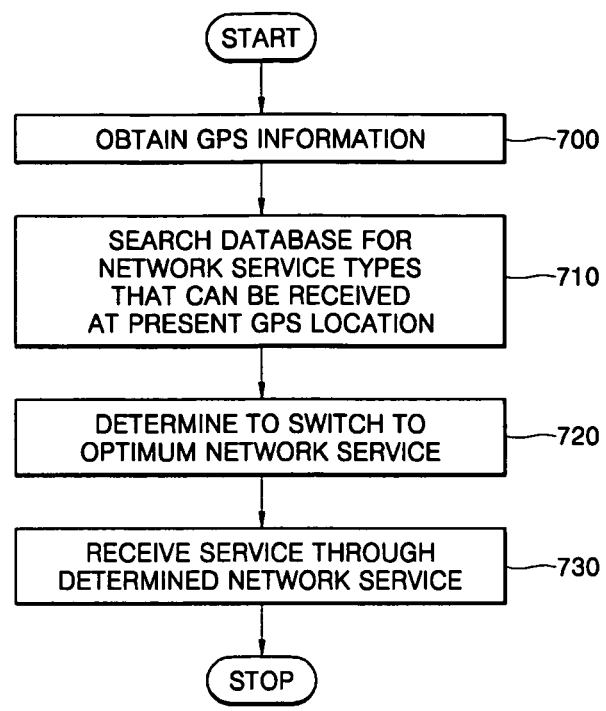
FIG. 7 is a flowchart of an embodiment of a method of the present invention capable of switching services by using GPS information when a mobile device travels to an area where a different service is provided.

FIG. 7 shows an expansion of the present invention, and is a flowchart of an embodiment of a method of the present invention capable of switching services by using GPS information when a mobile device travels to an area where a different service is provided. For example, there may be an area where two or more network service environments are different from each other in cost and service quality. For example, there may be an area where the wireless LAN service described above and a WiMAX service supporting IEEE 802.16e, which is a wireless standard providing a ultra high speed wideband access in a wired and wireless network environment, are applied together.

Referring to FIG. 7, the mobile device obtains information on the current location of the mobile device 102 through an embedded or connected GPS receiver in operation 700. In the mobile device 102, types of possible network services and location information on a range in which the network services are applied can be stored in advance in the form of a database or uploaded during a search operation. After obtaining information on its current location, the mobile device 102 finds types of network services that can be received at the location, in the database in operation 710. The mobile device 102 may automatically determine to switch to an optimum network service by considering factors, such as service fees, or a decision to switch to another network service can be made by selection of the user of the mobile device 102 in operation 720. If a network service to be switched to is selected, the mobile device 102 performs operations to receive a service from the corresponding network and then receives the service in operation 730.

Thus, by using the GPS or other positional and trajectory information, the mobile device selectively scans predetermined AP(s) when the mobile device is roaming in a wireless LAN service environment. By doing so, the time taken for hand-over can be reduced greatly by anticipating the likely AP. Also, wherever the mobile device is travelling, the mobile device can find whether or not different network services are applied, and at an area where network services are overlapping, the mobile device can select a desired (or preferable) network service.

According to the present invention, when roaming in a wireless LAN environment, a mobile device calculates a moving path by using GPS information and then, by scanning only APs belonging to channels allocated to areas related to the moving direction, the mobile device can reduce a hand-over period, and as a result, a QoS guaranteed service can be provided continuously. Also, by using GPS information, the mobile device can selectively switch to an optimum network service in an area to which different network services are applied.

While described in terms of GPS and GPS systems, it is understood that other positioning detection systems can be used or later developed which provide the mobile device with location and/or trajectory information. Further, while described in terms of a LAN, it is understood that aspects of the invention can be used with WAN, MAN and/or other wireless networks using localized access points (such as Bluetooth).

While not required in all aspects, the method of operations of the method may be encoded using one or more computer program encoded on one or more computer readable medium for use with one or more computer and/or controller.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hand-over method of a mobile device roaming in a wireless local area network (LAN) environment, the method comprising:

receiving global positioning system (GPS) information of the mobile device;

based on the received GPS information of the mobile device, identifying by the mobile device at least one access point (AP) other than the existing AP, to which the mobile device is currently connected, to be scanned for;

by scanning for the identified AP, detecting by the mobile device an AP to reassociate with; and reassociating the mobile device with the detected AP, wherein the identifying by the mobile device of the at least one AP comprises:

estimating a moving direction or moving path of the mobile device by using a plurality of GPS information items; and obtaining information on at least one AP included in a predetermined searching range on the basis of the estimated moving direction or moving path, from a channel table stored in the mobile device including location information of APs on a plurality of channels, wherein the scanning for the at least one identified AP includes hierarchically scanning for one or more identified APs through plural increasing and overlapping searching ranges, including the predetermined searching range, in different scanning operations until the identified AP to reassociate with is detected.

2. The method of claim 1, wherein the detecting of the AP comprises:

generating a list including obtained AP information;

updating an existing scanning channel list with the generated list; and detecting an AP to be reassociated with, by scanning for the APs of the updated channel list.

3. The method of claim 1, wherein the scanning includes hierarchically scanning last a predetermined searching range classified into a first level including APs on all channels, after a second level including APs on channels within a first angle relative to an axis represented by the estimated moving direction or path, after a third level including APs on channels within a second angle relative to the axis represented by the estimated moving direction or path and which is less than the first angle, after a fourth level including an AP within a narrowest angle relative to the axis represented by the estimated moving direction or moving path of the mobile device.

4. The method of claim 3, wherein the identifying of at least one AP to be scanned for includes identifying the AP belonging to the searching range of the fourth level first.

5. The method of claim 3, wherein the identifying of at least one AP to be scanned for includes identifying the APs belonging to the searching range of the third level.

6. The method of claim 3, wherein the identifying of at least one AP to be scanned for includes identifying the APs belonging to the searching range of the second level.

7. The method of claim 3, wherein the identifying of at least one AP to be scanned for and detecting the AP comprise:

identifying the AP to be scanned for of the fourth level, as a predetermined minimized searching range, based on the moving direction or moving path of the mobile device;

if as the result of the scanning for the AP of the fourth level, a matching AP is not detected, identifying the APs to be scanned for belonging to the third level other than APs of the fourth level;

if as the result of the scanning for the APs of the third level, a matching AP is not detected, identifying the APs to be scanned for belonging to the second level other than APs of the fourth and third levels; and if as the result of the scanning for the APs of the second level, a matching AP is not detected, identifying the APs to be scanned for belonging to the first level other than APs of the fourth, third, and second levels.

8. The method of claim 1, wherein:

the identifying of at least one AP to be scanned for includes identifying the AP belonging to a searching range of a fourth level selected from first through fourth levels of fields of view, a searching range of the first level is greater than a searching range of the second level;

the searching range of the second level is greater than a searching range of the third level; and the searching range of the third level is greater than the searching range of the fourth level.

9. The method of claim 1, wherein:

the identifying of at least one AP to be scanned for includes identifying the APs belonging to a searching range of a third level selected from first through fourth levels of fields of view, a searching range of the first level is greater than a searching range of the second level;

the searching range of the second level is greater than the searching range of the third level; and the searching range of the third level is greater than a searching range of the fourth level.

10. The method of claim 1, wherein:

the identifying of at least one AP to be scanned for includes identifying the APs belonging to a searching range of a second level selected from first through fourth levels of fields of view, a searching range of the first level is greater than the searching range of the second level;

the searching range of the second level is greater than a searching range of the third level; and the searching range of the third level is greater than a searching range of the fourth level.

11. The method of claim 1, wherein the identifying of at least one AP to be scanned for and scanning for the identified AP comprise:

identifying the AP of a fourth level, as a predetermined minimized searching range, to be scanned for on the basis of the estimated moving direction or moving path of the mobile device;

if as the result of the scanning for the AP of the fourth level, a matching AP is not detected, identifying the APs belonging to a third level other than APs of the fourth level to be scanned for;

if as the result of the scanning for the APs of the third level other than the fourth level, a matching AP is not detected, identifying the APs belonging to a second level other than APs of the fourth and third levels to be scanned for; and if as the result of the scanning for the APs of the second level, a matching AP is not detected, identifying the APs belonging to a first level other than APs of the fourth, third, and second level to be scanned for.

12. The method of claim 1, wherein each of AP related information items stored in the channel table comprises a basic service set (BSS) ID, an AP address, channel information, GPS information of the AP or combinations thereof.

13. The method as claimed in claim 1, further comprising:
based on the received GPS information, received in the mobile device, obtaining current location information of the mobile device;
based on the obtained current location information of the mobile device, recognizing at least one Local Access Network (LAN) network service receivable by the mobile device at the current location;
if the number of the recognized LAN network services is two or more, selecting one of the recognized LAN network services according to a predetermined condition; and
switching to the selected LAN network service.

14. The method of claim 13, wherein the recognizing of the network services includes identifying network services being provided at the current location of the mobile device from a database in the mobile device, which stores types of a variety of networks and applied areas in advance.

15. The method of claim 13, wherein the predetermined condition is set in terms of a most efficient price of unit-service of services.

16. The method of claim 1, wherein the detecting of the AP comprises:
generating a list including the obtained AP information;
updating an existing scanning channel list with the generated list; and
detecting an AP to be reassociated with, by scanning for the APs of the update channel list.

17. The method of claim 1, wherein:
the identifying of the at least one AP comprises the mobile device estimating the moving direction or moving path of the mobile device by using the plurality of GPS information items, and
the obtaining the information comprises the mobile device retrieving from a memory of the mobile device the channel table and obtaining the information on the at least one AP to be scanned for, based on which of the searching ranges is set to be next be scanned, from the retrieved channel table.

18. The method of claim 1, wherein the detecting of the AP comprises:
generating within the mobile device a list including obtained AP information;
retrieving from a memory of the mobile device an existing scanning channel list based which of the searching ranges is set to be next scanned;
updating within the mobile device the retrieved existing scanning channel list with the generated list to define which APs to scan for; and
detecting an AP to be reassociated with, by scanning for the APs of the updated channel list.

19. A mobile device performing hand-over when roaming in a wireless local area network (LAN) environment comprising:
a receiving unit receiving global positioning system (GPS) information of the mobile device;
an access point (AP) identifying unit identifying at least one AP, other than an existing AP to which the mobile device is connected, to be scanned for based on the received GPS information of the mobile device;
a detecting unit detecting an AP to reassociate with, by scanning for the at least one identified AP; and
a reassociating unit reassociating the mobile device with the detected AP,
wherein the AP identifying unit comprises:
an estimating unit estimating a moving direction or moving path of the mobile device by using a plurality of GPS information of the mobile device;
a memory storing a channel table including GPS information of APs on a plurality of channels; and
a unit obtaining information on at least one AP included in a predetermined searching range on the basis of the estimated moving direction or moving path, from the channel table,
wherein the scanning for the at least one identified AP includes hierarchically scanning for one or more identified APs through plural increasing and overlapping searching ranges, including the predetermined searching range, in different scanning operations until the identified AP to reassociate with is detected.

20. The mobile device of claim 19, wherein the AP detecting unit generates a list including the obtained AP information, updates an existing scanning channel list with the generated list, and detects an AP to be reassociated with, by scanning for the APs of the update channel list.

21. The mobile device of claim 19, wherein the scanning includes hierarchically scanning last a predetermined searching range classified into a first level including APs on all channels, after a second level including APs on channels within a first angle relative to an axis represented by the moving direction or path, after a third level including APs on channels within a second angle relative to the axis represented by the moving direction or path less than the first angle, and after a fourth level including an AP within a narrowest angle relative to the axis represented by the moving direction or moving path of the mobile device.

22. The mobile device of claim 21, wherein the AP identifying unit identifies the AP to be scanned for belonging to the searching range of the fourth level first.

23. The mobile device of claim 21, wherein the AP identifying unit identifies the APs to be scanned for belonging to the searching range of the third level.

24. The mobile device of claim 21, wherein the AP identifying unit identifies the APs to be scanned for belonging to the searching range of the second level.

25. The mobile device of claim 21, wherein the AP identifying unit and the AP detection unit identify the AP of the fourth level, as a predetermined minimized searching range, to be scanned for based on the moving direction or moving path of the mobile device;
if as the result of the scanning for the AP of the fourth level, a matching AP is not detected, identify the APs to be scanned for belonging to the third level other than APs of the fourth level;
if as the result of the scanning for the APs of the third level, a matching AP is not detected, identify the APs to be scanned for belonging to the second level other than APs of the fourth and third levels; and
if as the result of the scanning for the APs of the second level, a matching AP is not detected, identify the APs to be scanned for belonging to the first level other than APs of the fourth, third, and second levels.

26. The mobile device of claim 19, wherein:
the AP identifying unit identifies the AP to be scanned for belonging to a searching range of a fourth level selected from first through fourth levels,
a searching range of the first level is greater than a searching range of the second level;
the searching range of the second level is greater than a searching range of the third level; and the searching range of the third level is greater than the searching range of the fourth level.

27. The mobile device of claim 19, wherein:
the AP identifying unit identifies the APs to be scanned for belonging to a searching range of a third level selected from first through fourth levels,
a searching range of the first level is greater than a searching range of the second level;
the searching range of the second level is greater than the searching range of the third level; and
the searching range of the third level is greater than a searching range of the fourth level.

28. The mobile device of claim 19, wherein:
the AP identifying unit identifies the APs to be scanned for belonging to a searching range of a second level selected from first through fourth levels,
a searching range of the first level is greater than the searching range of the second level;
the searching range of the second level is greater than a searching range of the third level; and
the searching range of the third level is greater than a searching range of the fourth level.

29. The mobile device of claim 19, wherein the AP identifying unit and the AP detection unit:
identifies the at least one AP of a fourth level, as a predetermined minimized searching range, to be scanned for based on the moving direction or moving path of the mobile device;
if as the result of the scanning for the AP of the fourth level, a matching AP is not detected, identifies the APs to be scanned for belonging to a third level other than APs of the fourth level;
if as the result of the scanning for the APs of the third level, a matching AP is not detected, identifies the APs to be scanned for belonging to a second level other than APs of the fourth and third levels; and
if as the result of the scanning for the APs of the second level, a matching AP is not detected, identifies the APs to be scanned for belonging to a first level, including all APs, other than APs of the fourth, third, and second levels.

30. The mobile device of claim 19, wherein the channel table includes a basic service set (BSS) ID, an AP address, channel information, GPS information of the AP or combinations thereof.

31. The mobile device of claim 19, wherein the unit detecting an AP to reassociate with, by scanning for the at least one identified AP, generates a list including the obtained AP information, updates an existing scanning channel list with the generated list, and detects an AP to be reassociated with, by scanning for the APs of the update channel list.

32. A hand-over method of a mobile device roaming in a wireless network environment, the method comprising:
detecting, by the mobile device, positional information indicating at least a movement of the mobile device relative to one access point to which the mobile device is connected;
anticipating, by the mobile device, another access point to which the mobile device is connectable according to the indicated movement and a table storing a location of the another access point, the table being stored in the mobile device; and
reassociating, by the mobile device, the mobile device with the anticipated another access point,
wherein the anticipating includes obtaining, from the table, information on at least the another access point included in a first searching range selected on the basis of a direction of the indicated movement, and obtaining, from the table, information on at least an additional access point other than the other access point included in a second larger searching range, in the direction and greater than the first searching range, when the other access point is not found in a scanning of the first searching range.

33. A mobile device performing hand-over when roaming in a wireless network environment, comprising:
a wireless communication unit transmitting data with respect to one access point (AP) and which is capable of communicating with another AP; and
a controller which determines a motion of the mobile device relative to the one AP, retrieves location information on the another AP based on the determined motion, and uses the wireless communication unit to reassociate the mobile device with the another AP and disconnect the mobile device from the one AP while maintaining a quality of service (QoS) connection,
wherein the retrieving of location information for the other AP includes obtaining information on at least the other AP included in a hierarchically selected searching range, by the controller, selected from increasing and overlapping searching ranges for a same direction of the determined motion, and, if the other AP is not found in a scanning of the selected searching range, retrieving location information for an additional AP included in a larger searching range of the searching ranges and scanning for the additional AP in the larger searching range.

34. A hand-over method of a mobile device roaming in a wireless local area network (LAN) environment, the method comprising:
receiving global positioning system (GPS) information of the mobile device;
identifying at least one access point (AP), other than the existing AP to which the mobile device is currently connected, that exists within a select searching range from increasing and overlapping searching ranges all relative to the received GPS information, wherein the identifying sequentially selects a current select searching range for respective scanning for a respectively identified AP in sequence beginning with a smaller searching range of the searching ranges, smaller than a greatest searching range of the searching ranges, and sequencing from the smaller searching range toward the greatest searching range until the respectively identified AP is found;
scanning for the current select searching range based on the respectively identified AP, before the identifying identifies an AP to be scanned for in a next current select searching range of the sequentially selected searching ranges; and
reassociating the mobile device with an AP found in the scanning.

35. The method of claim 34, wherein the reassociating includes requesting an association with the found AP and delaying association with the found AP until after the found AP confirms a maintenance of a Quality of Service (QoS) connection for the mobile device and another device, the QoS maintenance confirmation being confirmed by the found AP after requesting by the found AP of the corresponding QoS connection from the existing AP.

36. The method of claim 34, wherein the scanning for the at least one AP comprises:
estimating a moving direction or moving path of the mobile device by using a plurality of GPS information items; and sequentially obtaining information of respective APs included in each select searching range from a channel table including location information of APs on a plurality of channels, with all searching ranges being based on the moving direction or moving path.

37. The method of claim 34, wherein the increasing and overlapping searching ranges are defined according to angles of degree from an axis represented by an estimated moving direction or moving path of the mobile device, such that APs within a smallest of the searching ranges would be represent those APs that fall within a predetermined smallest angle from the axis in the moving direction or moving path, and APs within a greater searching range would represent APs that fall with a greater predetermined angle from the axis in the moving direction or moving path, such that the APs that fall within the smallest angle from the axis also fall within the greater angle from the axis.

38. The method of claim 34, wherein the detecting of the AP comprises:
   generating a list including obtained AP information for a currently selected searching range;
   updating an existing scanning channel list, which is based on a previous scanned searching range, based on the generated list, with the generating of the list being performed before scanning the currently selected searching range; and
   scanning for the APs of the updated channel list for the scanning of the currently selected searching range.

39. The method of claim 38, wherein the generated list for the greatest searching range includes a complete listing of all available channels to be scanned,
   the generated list for a middle searching range, smaller than the greatest searching range and greater than the smaller searching range, includes a middle listing of the available channels, less than all of the available channels, to be scanned, and
   the generated list for the smaller searching range includes a smaller listing of the available channels, less than the middle listing of the available channels, to be scanned.

40. The method of claim 39, wherein the generated list for the smaller searching range includes only a single channel.

41. A mobile device performing hand-over when roaming in a wireless local area network (LAN) environment comprising:
   a receiving unit receiving global positioning system (GPS) information of the mobile device;
   an access point (AP) identification unit identifying at least one AP, other than the existing AP to which the mobile device is currently connected, that exists within a select searching range from increasing and overlapping searching ranges all relative to the received GPS information, wherein the identifying sequentially selects a current select searching range for respective scanning for a respectively identified AP in sequence beginning with a smaller searching range of the searching ranges, smaller than a greatest searching range of the searching ranges, and sequencing from the smaller searching range toward the greatest searching range until the respectively identified AP is found;
   an AP detecting unit scanning the current select searching range for the respectively identified AP, before the identifying identifies an AP to be scanned for in a next current select searching range of the sequentially selected searching ranges; and
   a reassociating unit reassociating the mobile device with an AP found in the scanning.

42. The mobile device of claim 41, wherein the reassociating of the reassociating unit includes requesting an association with the found AP and delaying association with the found AP until after the found AP confirms a maintenance of a Quality of Service (QoS) connection for the mobile device and another device, the QoS maintenance confirmation being confirmed by the found AP after requesting by the found AP of the corresponding QoS connection from the existing AP.

43. The mobile device of claim 41, wherein the AP identification unit further comprises:
   an estimating unit estimating a moving direction or moving path of the mobile device by using a plurality of GPS information items; and
   an information obtaining unit sequentially obtaining information of respective APs included in each select searching range from a channel table including location information of APs on a plurality of channels, with all searching ranges being based on the moving direction or moving path.

44. The mobile device of claim 41, wherein the increasing and overlapping searching ranges are defined according to angles of degree from an axis represented by an estimated moving direction or moving path of the mobile device, such that APs within a smallest of the searching ranges would be represent those APs that fall within a predetermined smallest angle from the axis in the moving direction or moving path, and APs within a greater searching range would represent those APs that fall with a greater predetermined angle from the axis in the moving direction or moving path, such that the APs that fall within the smallest angle from the axis also fall within the greater angle from the axis.

45. The mobile device of claim 41, wherein the AP detecting unit generates a list including obtained AP information for a currently selected searching range, updates an existing scanning channel list, which is based on a previous scanned searching range, based on the generated list, with the generating of the list being performed before scanning the currently selected searching range, and scanning for the APs of the updated channel list for the scanning of the currently selected searching range.

46. The mobile device of claim 45, wherein the generated list for the greatest searching range includes a complete listing of all available channels to be scanned,
   the generated list for a middle searching range, smaller than the greatest searching range and greater than the smaller searching range, includes a middle listing of the available channels, less than all of the available channels, to be scanned, and
   the generated list for the smaller searching range includes a smaller listing of the available channels, less than the middle listing of the available channels, to be scanned.

47. The method of claim 46, wherein the generated list for the smaller searching range includes only a single channel.

* * * * *

UNITED STATES PATENT AND TRADEMARK OFFICE
CERTIFICATE OF CORRECTION

PATENT NO. : 8,897,777 B2
APPLICATION NO. : 11/328215
DATED : November 25, 2014
INVENTOR(S) : Hyong-uk Choi Page 1 of 1

It is certified that error appears in the above-identified patent and that said Letters Patent is hereby corrected as shown below:

On the Title Page

Item (73), Column 1 (Assignee), Line 1:

Delete "Electroncis" and insert --Electronics--, therefor.

Signed and Sealed this
Fifteenth Day of September, 2015

Michelle K. Lee
*Director of the United States Patent and Trademark Office*